June 25, 1935.  M. ZAIGER  2,006,006

WINDSHIELD HEATER

Filed Jan. 26, 1935

Inventor.
Max Zaiger
by Heard Smith & Tennant.
Attys.

Patented June 25, 1935

2,006,006

UNITED STATES PATENT OFFICE 2,006,006

WINDSHIELD HEATER

Max Zaiger, Swampscott, Mass.

Application January 26, 1935, Serial No. 3,605

3 Claims. (Cl. 219—19)

This invention relates to electric windshield heaters of the so-called "glass pane" type and the object of the invention is to provide a windshield heater of this construction with a thermostat element to control the supply of current to the heating element, the construction being such that when the temperature in the chamber formed by the windshield heater and the windshield reaches a predetermined point the circuit supplying the electric heating units will be automatically opened.

One advantage of this construction is that whenever there is sufficient heat in said chamber to enable the windshield heater to perform properly its functions, the supply of further current to the coils will automatically cease, thereby preventing any unnecessary drain on the battery. A further advantage is that when the temperature in said chamber falls below that point at which the windshield heater will function properly, the circuit for the heating coils will be automatically closed thereby supplying current to said coils.

A further advantage is that by thus controlling the current which is supplied to the heating coils, all danger that the coils will develop sufficient heat to crack the windshield glass is avoided.

In order to give an understanding of my invention I have illustrated in the drawing a selected embodiment thereof which will now be described after which the novel features will be pointed out in the appended claims.

Figure 2:
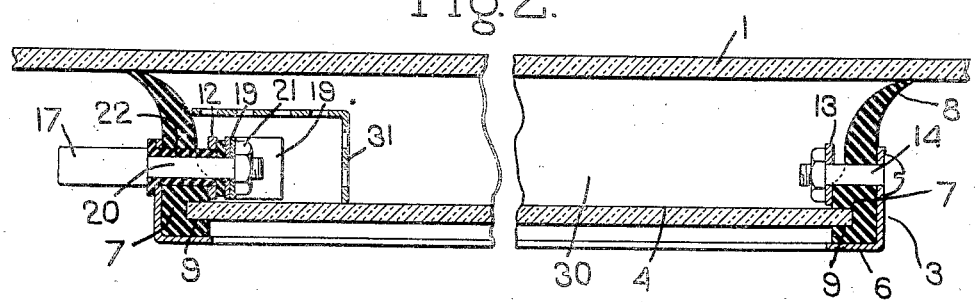
Fig. 2 is an enlarged section on the line 2—2 Fig. 1.
Figure 3:
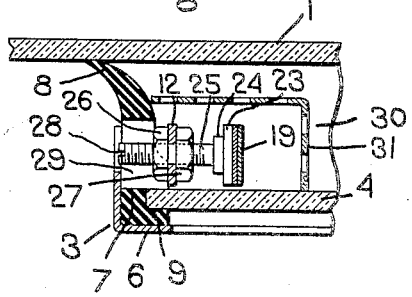
Fig. 3 is an enlarged section on the line 3—3 Fig. 1.

In the drawing, 1 indicates the windshield of the automobile and 2 indicates generally the windshield heater. This heater is of the type comprising a skeleton frame element 3 supporting a glass pane 4 and having located within it electrical heating coils 5. The frame element is formed with the exterior metal frame member 6 and with a rubber glass-holding member 7 which fits within the exterior frame 6 and is formed with the flexible lip 8 adapted to engage the windshield 1. This rubber glass-holding member 7 is formed with a glass-receiving groove 9 in which the edges of the glass pane 4 are received as shown best in Fig. 2. The exterior frame member 6 is formed with extensions 10 which carry suction cups 11 by which the heater is secured to the windshield.

The heating coils 5 which extend from one end to the other of the heater are secured at one end to a strip 12 situated inside of the glass-holding member 7 and insulated from the metal frame member 6, and at the other end said coils are secured to the ends of another strip 13 also situated inside of the glass-holding member 7 but electrically connected to the exterior frame member 6.

As herein shown the strip 13 is retained in place by two bolts 14 which extend from said strip, through the glass-holding member 7 and through the side flange of the frame member 6.

A similar bolt 15 may be used for retaining the insulated strip 12 in place, said bolt 15 being insulated from the outer frame member 6 by suitable insulation 16.

17 and 18 indicate two terminals through which the current is supplied to the coils 5, these terminals being of a construction to permit them to be connected to a supply circuit through the medium of an ordinary plug connection. The terminal 18 may be secured directly to the outer frame member 6. The terminal 17 is insulated from the outer frame member 6 and is connected to the strip 12 through the medium of a thermostatic element. This thermostatic element is indicated at 19 and is in the form of a strip of bi-metallic material such as is usually used in thermostats, one end of which is electrically connected to the terminal 17. The terminal 17 is shown as having a shank portion 20 which extends through the frame member 6, the rubber glass-holding member 7, and the strip 12, the end of said shank passing through the thermostatic element 19 and having a nut 21 screw-threaded thereto for retaining the thermostatic element 19 in place. The terminal 17 is insulated from both the outer frame member 6 and the strip 12 by suitable insulation 22.

The outer or free end of the thermostatic element 19 carries a contact 23 adapted to co-operate with a contact 24 adjustably carried by the strip 12. This contact 24 has a screw-threaded stem 25 which extends through the strip 12 and is held in position by two lock nuts 26, 27 screw-threaded to the stem and engaging opposite faces of the strip 12. The outer end of the stem 25 is provided with a screw driver notch 28 and the glass-holding member 7 as well as the outer frame member 6 is cut away as at 29 to provide an opening to receive the outer end of the stem. By adjusting the nuts 26, 27 the contact 24 may be adjusted to cause the circuit to open at any desired temperature.

Figure 1:
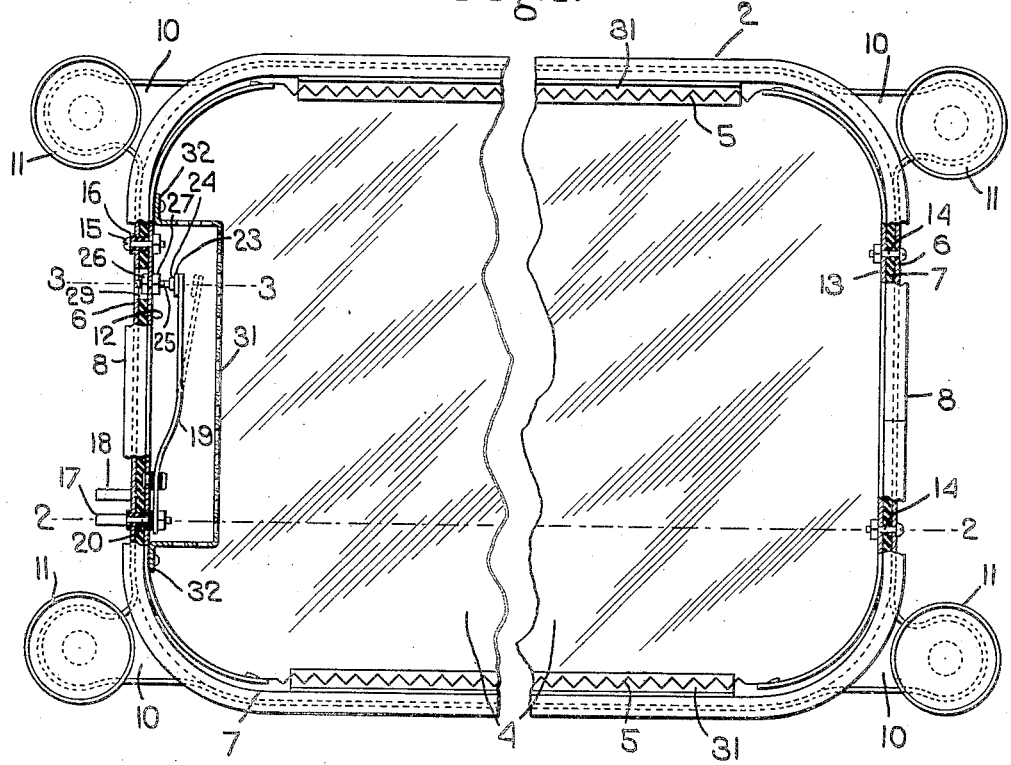
Fig. 1 is a view of a windshield heater embodying my invention with a portion broken out, said figure showing the side of the windshield heater which is applied to the windshield.

The thermostatic element 19 is so constructed that as the temperature decreases it tends to flex or bend toward the left Fig. 1 and when the temperature rises it tends to flex or bent toward the right. When the heater is in use the heating circuit includes the terminal 17, the thermostatic element 19, contacts 23, 24, strip 12, heating coils 5, strip 13, frame element 6 and the terminal 18.

The thermostat will be so adjusted that when the temperature is in the vicinity of a freezing temperature, the thermostatic element 19 will assume a position in which a contact 23 is closed onto the contact 24, thereby closing the heating circuit. The heat developed from the heating coils 5 will heat the air in the chamber 30 between the glass pane 4 and windshield 1, and as the temperature rises in said chamber 30 the thermostatic element tends to move toward the right Fig. 1. When a predetermined temperature has been reached the thermostatic element will assume a position in which the contacts 23, 24 are separated thereby breaking the heating circuit. This circuit will remain broken at the thermostatic contacts until the temperature in the chamber 30 again falls below the predetermined point, at which time the circuit will be automatically closed.

With this invention, therefore, when the windshield heater is in use the current will be supplied to the heating coils only when the temperature in the chamber 30 is below a predetermined point and the current will be cut off automatically as soon as this predetermined temperature has been reached in the chamber 30. With this device, therefore, current will be supplied to the heating coils only when needed to maintain the required temperature in the chamber 30, thereby avoiding unnecessary drain on the battery of the automobile and also avoiding the possibility that the windshield will become heated sufficiently to cause it to crack.

While I have shown one embodiment of the invention, I do not wish to be limited to the constructional features illustrated.

31 indicates a casing or housing which is secured to the strip 12 and which encloses the thermostatic element 19. This housing may be made of perforated material so as to allow the free circulation of air therethrough. The housing is shown as having ears 32 by which it is secured to the strip 12 through the medium of suitable screws.

I claim:

1. A windshield heater comprising a frame element including an exterior metal frame member and a glass-holding member of rubber carried thereby, said glass-holding member having a flexible lip to engage the windshield and a glass-supporting groove, a pane of glass having its edges received in said groove, two resistor-supporting strips at opposite ends of the frame both situated within the glass-supporting member, one of which is insulated from the metal frame member and the other of which is electrically connected thereto, heating resistors connected at one end to one strip and at the other end to the other strip, a supply terminal insulated from the metal frame member, a thermostatic element connected to said terminal and a contact carried by the insulated resistor-supporting strip and cooperating with the thermostatic element to close the heating circuit when the temperature is below a predetermined point and to open said circuit when the temperature is above said point.

2. A windshield heater comprising a frame element including an exterior metal frame member and a glass-supporting member of rubber fitting within the frame member, said glass-supporting member having a flexible lip to engage the windshield, two resistor-supporting strips situated within the glass-supporting member, one at each end of the frame, one strip being insulated from the metal frame member and the other strip being electrically connected thereto, heating resistors within the frame connected at one end to one strip and at the other end to another strip, two circuit terminals, one of which is connected to the metal frame member, the other terminal having a shank extending through the metal frame member, the glass-supporting member and the insulated strip and being insulated from both said strip and the frame member, a thermostatic element connected to said terminal member, a contact adjustably carried by the insulated strip and with which the thermostatic element co-operates to close the heating circuit when the temperature is below a predetermined point and to open said circuit when the temperature is above said point, said metal frame member and glass-supporting member being cut away to give access to the stem of said contact from the exterior of the frame for adjustment purposes.

3. A windshield heater comprising a frame element having a flexible lip to engage a windshield, a glass pane carried by said frame element and forming with the windshield a heating chamber, two resistor-supporting strips at opposite ends of the frame on the interior thereof, one of which strips is insulated from the metal frame member and the other of which is electrically connected thereto, heating resistors connected at one end to one strip and at the other end to the other strip, two circuit terminals carried by the metal frame member, one of the terminals being insulated therefrom, a thermostatic element mounted within said frame member and connected to said latter terminal and a contact carried by the insulated resistor-supporting strip and co-operating with the thermostatic element to close the heating circuit when the temperature within said chamber is below a predetermined point and to open said circuit when the temperature rises above said point.

MAX ZAIGER.